(12) United States Patent
Okada

(10) Patent No.: US 9,654,660 B2
(45) Date of Patent: May 16, 2017

(54) ELECTRONIC DEVICE

(71) Applicant: Yasushi Okada, Kanagawa (JP)

(72) Inventor: Yasushi Okada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 91 days.

(21) Appl. No.: 14/549,786

(22) Filed: Nov. 21, 2014

(65) Prior Publication Data

US 2015/0146225 A1 May 28, 2015

(30) Foreign Application Priority Data

Nov. 28, 2013 (JP) ................................. 2013-246620
Sep. 5, 2014 (JP) ................................. 2014-181643

(51) Int. Cl.
*H04N 1/00* (2006.01)

(52) U.S. Cl.
CPC ..... *H04N 1/00981* (2013.01); *H04N 1/00557* (2013.01); *H04N 2201/0094* (2013.01)

(58) Field of Classification Search
CPC ........... H04N 1/00557; H04N 1/00981; H04N 2201/0044
USPC .............................................. 358/1.14, 1.15
See application file for complete search history.

(56) References Cited

U.S. PATENT DOCUMENTS

| 6,438,339 B1* | 8/2002 | Kaiho | ................ | G03G 15/6552 399/405 |
|---|---|---|---|---|
| 2003/0133368 A1 | 7/2003 | Gotoh et al. | | |
| 2008/0049396 A1* | 2/2008 | Campbell | .......... | H05K 7/20754 361/696 |
| 2008/0055675 A1 | 3/2008 | Okada | | |
| 2008/0068787 A1 | 3/2008 | Okada | | |
| 2008/0267664 A1* | 10/2008 | Miyanagi | ............. | G03G 15/326 399/220 |
| 2009/0059262 A1* | 3/2009 | Takuwa | ............. | H04N 1/00496 358/1.13 |
| 2012/0189348 A1* | 7/2012 | Yamamoto | ......... | G03G 15/0291 399/168 |

FOREIGN PATENT DOCUMENTS

| JP | 2003-087465 | 3/2003 |
|---|---|---|
| JP | 2005-101785 | 4/2005 |
| JP | 2005-297487 | 10/2005 |

* cited by examiner

*Primary Examiner* — John Wallace
*Assistant Examiner* — Darryl V Dottin
(74) *Attorney, Agent, or Firm* — Harness, Dickey & Pierce, P.L.C.

(57) ABSTRACT

The present invention provides an electronic device that includes: a main body; an information processing device housed in the main body, the front face of a housing of the information processing device being installed on the back side of a panel of the main body; and a duct that leads the external air of the main body to the information processing device. The information processing device includes a fan that takes the external air from the back face opposite from the front face into the inside and discharges the air taken in to the outside from the front face. The duct is an air passage that leads the air from the outside of the panel of the main body to the back face of the housing of the information processing device.

13 Claims, 15 Drawing Sheets

ELECTRONIC DEVICE

CROSS-REFERENCE TO RELATED APPLICATIONS

The present application claims priority to and incorporates by reference the entire contents of Japanese Patent Application No. 2013-246620 filed in Japan on Nov. 28, 2013 and Japanese Patent Application No. 2014-181643 filed in Japan on Sep. 5, 2014.

BACKGROUND OF THE INVENTION

1. Field of the Invention

The present invention relates to an electronic device.

2. Description of the Related Art

Multifunction peripherals have been known that include a plurality of functions such as a printer, a copier, a facsimile machine, and a scanner. The multifunction peripherals have been also known that include an information processing device having a central processing unit (CPU) and a storage device inside thereof. Such a multifunction peripheral including an information processing device executes a certain image process on image data acquired by its scanning or facsimile function, and then prints the processed image data using its printing device. Conventional technologies are described in Japanese Patent Application Laid-open No. 2005-297487, for example.

The multifunction peripheral having the information processing device provided inside thereof, however, generates a large quantity of heat that may affect the operations of the multifunction peripheral.

In view of the circumstances described above, there is a need to provide an electronic device capable of reducing the effect of the heat generated by the information processing device provided inside of the electronic device.

SUMMARY OF THE INVENTION

It is an object of the present invention to at least partially solve the problems in the conventional technology.

According to the present invention, there is provided an electronic device comprising: a main unit; an information processing device housed in the main unit, the front face of a housing of the information processing device being installed on the back side of a panel of the main unit; and a duct that leads external air of the main unit to the information processing device, wherein the information processing device comprises a fan that takes air from the back face opposite from the front face into the inside and discharges the air to the outside from the front face, and the duct is an air passage that leads the air from the outside of the panel of the main unit to the back face of the housing of the information processing device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image forming apparatus 10 serving as an example of electronic devices will now be explained with reference to the appended drawings.

First Embodiment

Figure 1:
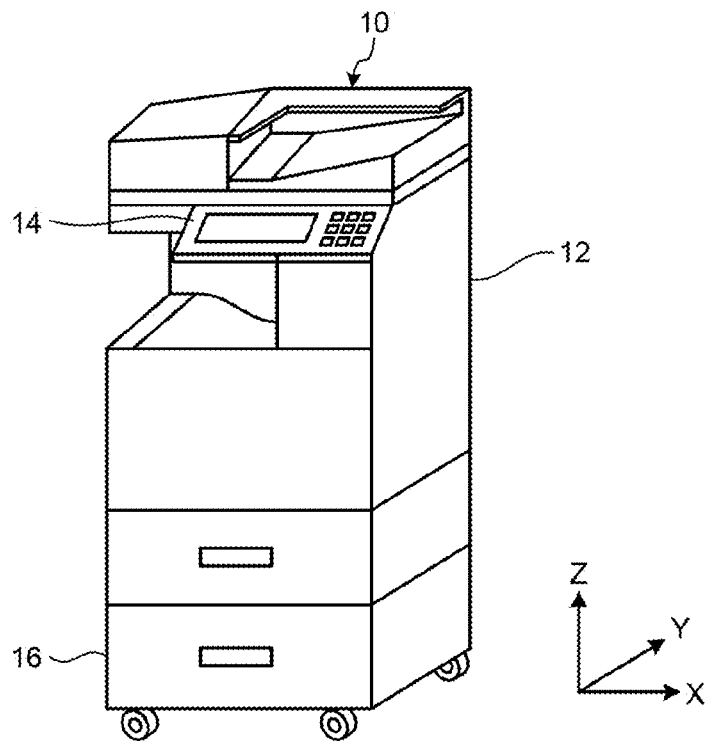
FIG. 1 is an external view of an image forming apparatus 10 according to a first embodiment of the present invention viewed from the front side.

FIG. 1 is an external view of an image forming apparatus 10 according to a first embodiment viewed from the front side. The image forming apparatus 10 is a multifunction peripheral including a plurality of functions such as a printer, a copier, a facsimile machine, and a scanner. The image forming apparatus 10 forms images on a recording medium such as a paper sheet.

The image forming apparatus 10 includes a main body 12 having a substantially rectangular parallelepiped shape. The main body 12 of the image forming apparatus 10 is disposed on a floor. The image forming apparatus 10 includes an operation panel 14 on the upper front side of the main body 12. The image forming apparatus 10 includes principal parts such as an image forming unit on the upper side of the main body 12.

The main body 12 has a paper feeding unit 16 provided on the lower side thereof, that is the position nearest to the floor. The paper feeding unit 16 includes a storage section that stores therein paper sheets, and a paper feeding device that feeds the paper sheets stored in the storage section to the image forming unit.

In the embodiment, the direction in parallel with the front face of the main body 12 and also in parallel with the floor is defined as an X direction. The direction along the side extending from the front face to the rear face of the main body 12 and parallel with the floor is defined as a Y direction. The direction along the side extending from the lower side to the upper side of the main body 12 is defined as a Z direction. The X direction, the Y direction, and the Z direction are orthogonal to one another.

Figure 2:
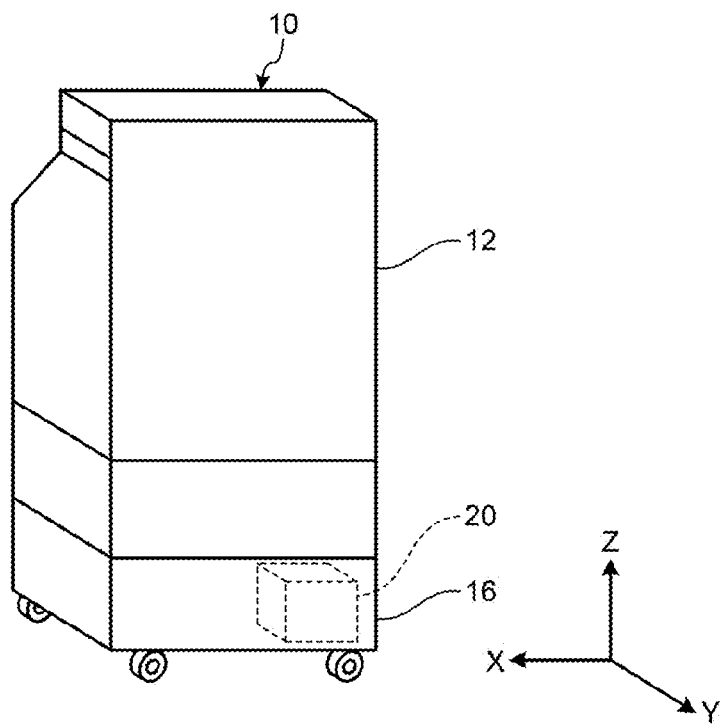
FIG. 2 is an external view of an image forming apparatus 10 according to the first embodiment viewed from the rear side.

FIG. 2 is an external view of the image forming apparatus 10 according to the first embodiment viewed from the rear side. The paper feeding unit 16 includes an information processing device 20.

The information processing device 20 has a substantially rectangular parallelepiped shape. The information processing device 20 includes a storage device and a central processing unit (CPU). The information processing device 20 exchanges data externally, stores the data therein, and executes a computer program, for example. The information processing device 20 is capable of being coupled to an external local area network (LAN) cable and exchanging data with principal parts of the image forming apparatus 10 through the LAN cable. The electric power is supplied to the information processing device 20 by a power supply line different from the line in the system for the principal functions of the image forming apparatus 10. This configuration enables the information processing device 20 to operate even if the main power supply of the image forming apparatus 10 is turned off.

The information processing device 20 is housed inside of the paper feeding unit 16 provided on the lowest part of the main body 12. More specifically, the information processing device 20 is disposed behind the paper feeding device in the paper feeding unit 16 and at the corner between the rear side and the left side of the image forming apparatus 10. That is, the information processing device 20 is disposed far from the principal parts such as the image forming unit disposed on the upper side of the image forming apparatus 10. The information processing device 20 is disposed at the corner between the rear side and a side of the image forming apparatus 10. This configuration enables the information processing device 20 to efficiently release the heat generated inside thereof to the outside. As described above, the image forming apparatus 10 can reduce the quantity of heat conducted from the information processing device 20 to the principal parts such as the image forming unit disposed on the upper side of the image forming apparatus 10.

In the image forming apparatus 10, the information processing device 20 is provided inside of the paper feeding unit 16, which can prevent the information processing device 20 from being stolen. In the image forming apparatus 10, the information processing device 20 is provided in the lower side of the main body 12, which can reduce the vibration on the information processing device 20.

In the present embodiment, the information processing device 20 is housed inside of the paper feeding unit 16. This layout is provided merely for exemplary purpose and not limiting, and the information processing device 20 may be disposed in another position in the main body 12.

Figure 3:
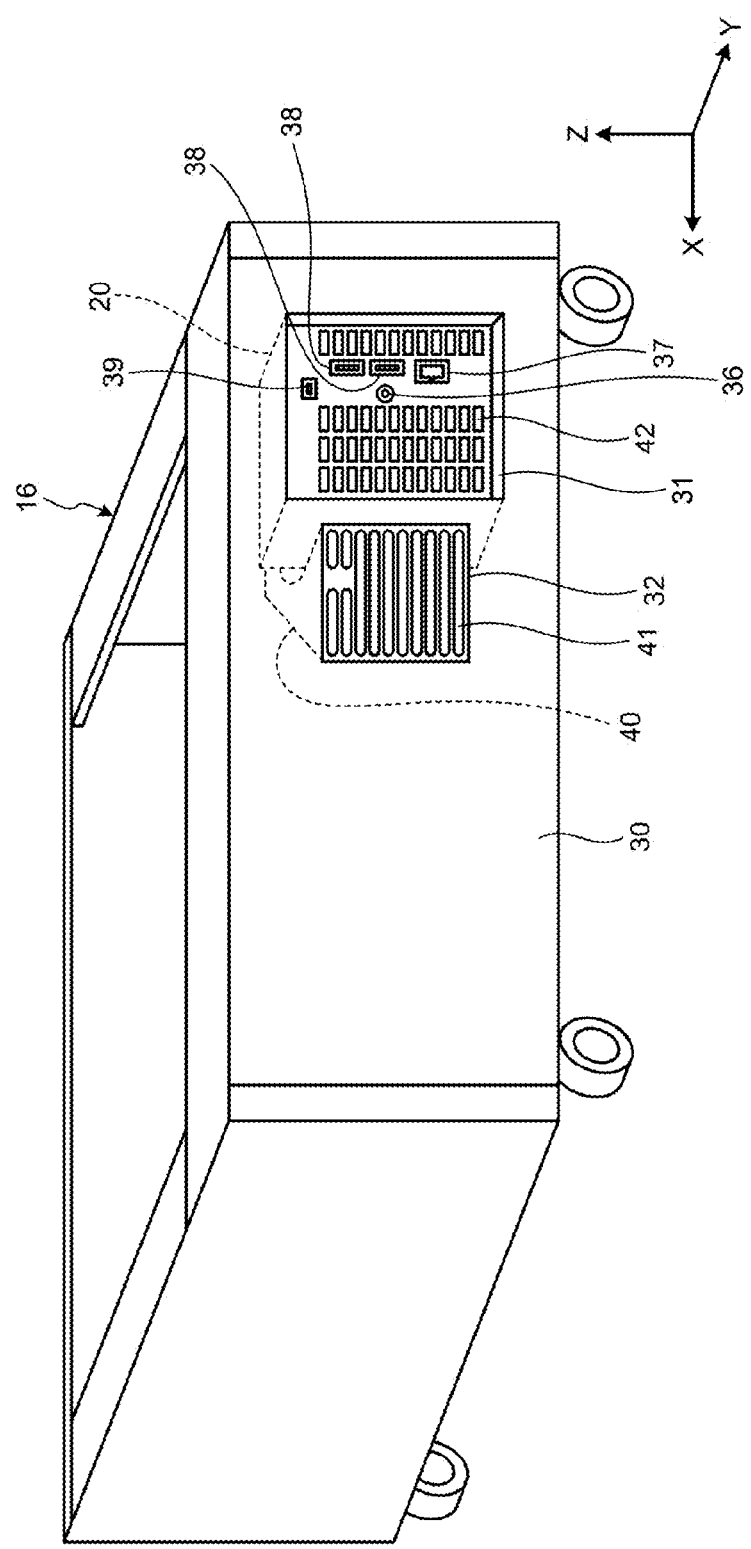
FIG. 3 is an external view of a paper feeding unit 16 according to the first embodiment viewed from the rear side.

FIG. 3 is an external view of the paper feeding unit 16 viewed from the rear side. A device mounting region 31 and a duct mounting region 32 are provided on a rear panel 30 of the paper feeding unit 16. On the back side of the device mounting region 31, the information processing device 20 is installed. The information processing device 20 is installed with a bolt, for example, on the rear panel 30. A duct 40 is installed on the back side of the duct mounting region 32.

In the device mounting region 31, a power supply connector 36, a LAN connector 37, universal serial bus (USB) connectors 38, and a switch 39 are provided. A power cable is coupled to the power supply connector 36 for supplying the electricity to the information processing device 20. A LAN cable is coupled to the LAN connector 37 for coupling the information processing device 20 to a network. A USB cable is coupled to a USB connector 38 for coupling to an external device. The switch 39 is used for turning on and off the power supply of the information processing device 20.

In the duct mounting region 32, a plurality of intake holes 41 are formed for taking in the external air to the duct 40. In the device mounting region 31, a plurality of emission holes 42 are formed for discharging the air emitted from the front face of the housing of the information processing device 20 to the outside of the main body 12.

Figure 4:
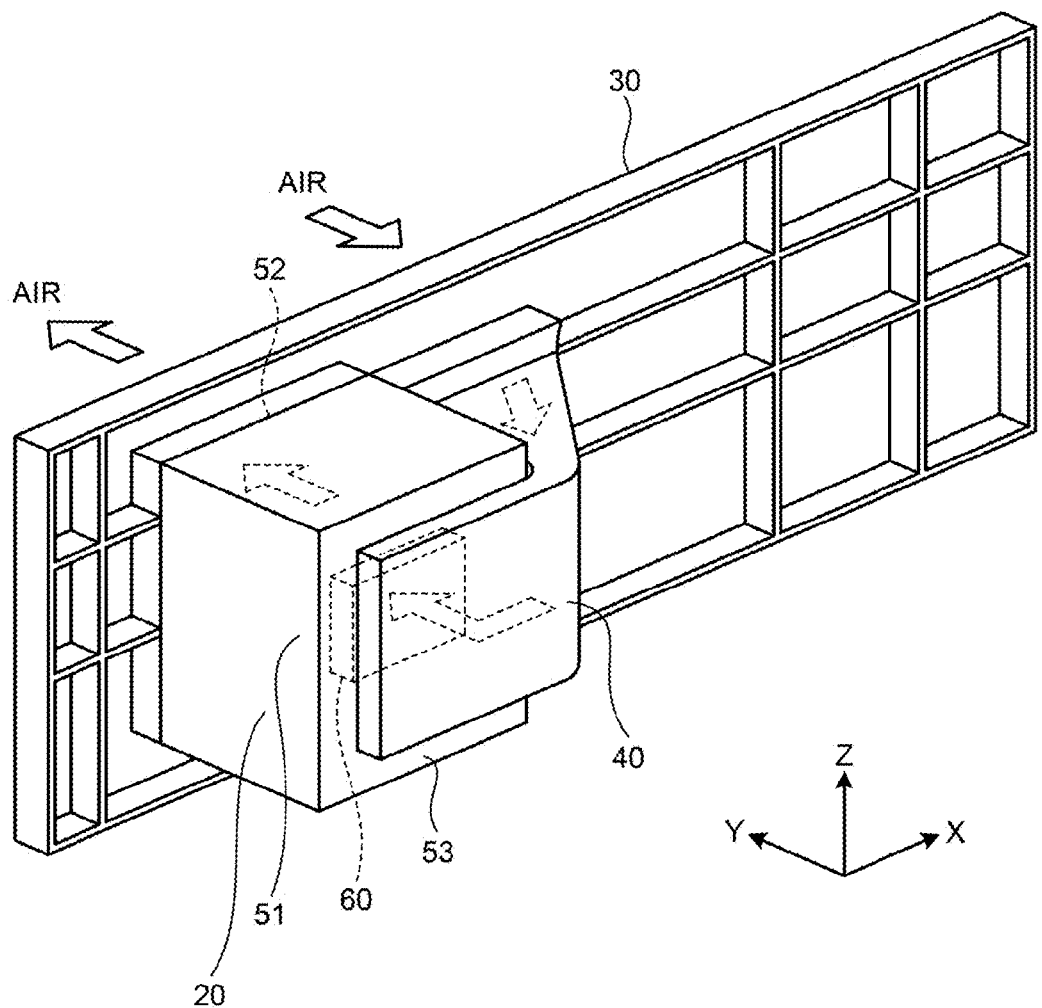
FIG. 4 is an external view of an information processing device 20 and a duct 40 according to the first embodiment viewed from the back side of a rear panel 30.

FIG. 4 is an external view of the information processing device 20 and the duct 40 viewed from the back side of the rear panel 30. A front face 52 of a housing 51 having a substantially rectangular parallelepiped shape is fixed to the back side of the rear panel 30, whereby the information processing device 20 is installed on the rear panel 30.

In the information processing device 20, a fan 60 is provided in the vicinity of the back face 53 opposite from the front face 52 in the housing 51. The fan 60 takes the external air from the back face 53 into the housing 51 and discharges the air taken in the housing 51 to the outside from the front face 52. The air discharged from the front face 52 of the housing 51 is emitted from the emission holes 42 of the rear panel 30 to the outside of the main body 12.

The duct 40 is a hollow tubular structure and serves as an air passage. The duct 40 has its one end installed at the back side of the duct mounting region 32 of the rear panel 30 and the other end installed at an intake position of the fan 60 on the back face 53 of the housing 51 of the information processing device 20. The duct 40 takes in the air from the outside of the rear panel 30 through the intake holes 41 and leads the air to the fan 60 on the back face 53 of the housing 51 of the information processing device 20.

With the structure of the information processing device 20 and the duct 40, as illustrated with the arrows in FIG. 4, the fan 60 rotates to take in the air, thereby leading the air outside of the rear panel 30 to the fan 60 on the back face 53 of the housing 51 of the information processing device 20 through the duct 40. The air taken in by the fan 60 flows into the housing 51, flows from the back face 53 to the front face 52, and is discharged from the front face 52 of the housing 51. The air discharged from the front face 52 of the housing 51 is emitted through the emission holes 42 to the outside of the rear panel 30.

This operation enables the information processing device 20 and the duct 40 to take in the air outside of the image forming apparatus 10 to cool the components in the housing 51 of the information processing device 20. This operation enables the information processing device 20 and the duct 40 to efficiently cool the inside of the housing 51 using the air outside of the image forming apparatus 10 having a relatively low temperature.

The information processing device 20 and the duct 40 also discharge the air heated by the components in the housing 51 to the outside of the image forming apparatus 10. This operation enables the information processing device 20 to reduce the quantity of heat conducted to other functions (e.g., the principal parts such as the image forming unit) in the image forming apparatus 10. The information processing device 20 may have a plurality of fans 60 in the housing 51.

Figure 5:
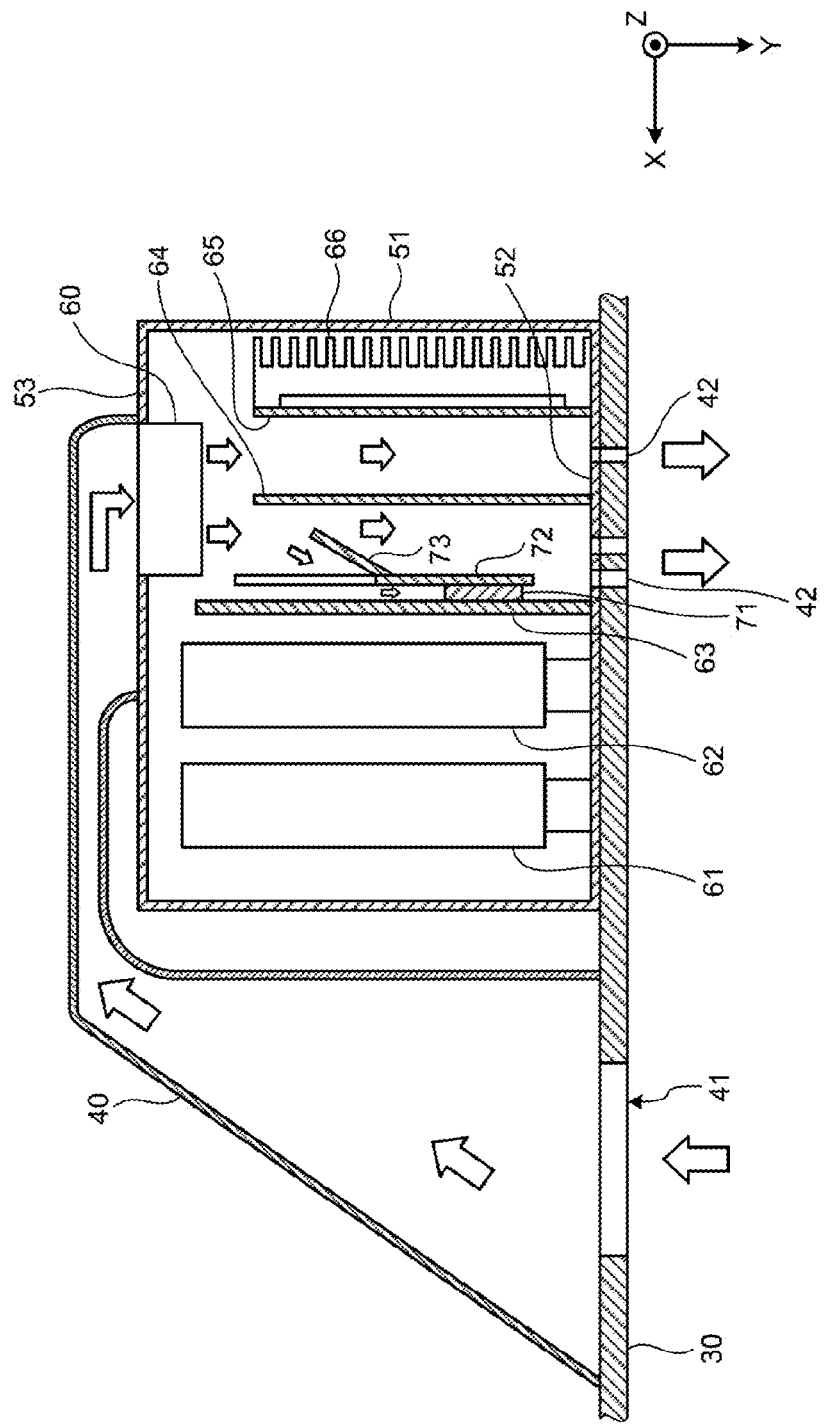
FIG. 5 is a diagram of the information processing device 20 and the duct 40 according to the first embodiment viewed from the upper side.
Figure 6:
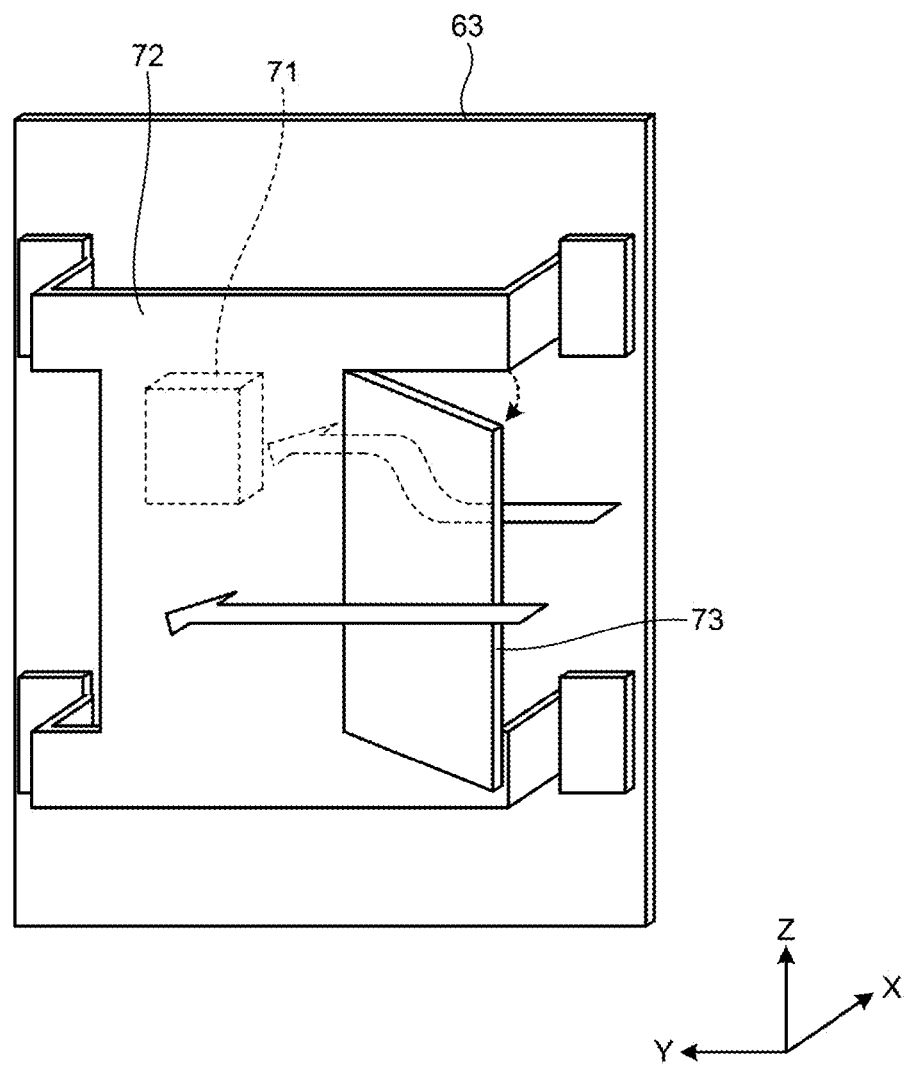
FIG. 6 is a diagram illustrating the structure of a heat discharging plate 72 mounted on a control board 63 according to the first embodiment.

FIG. 5 is a diagram of the information processing device 20 and the duct 40 viewed from the upper side. FIG. 6 is a diagram illustrating the structure of a heat discharging plate 72 mounted on a control board 63.

The information processing device 20 includes a first hard disk drive 61, a second hard disk drive 62, the control board 63, a power supply board 64, a main board 65, and a heat discharger 66. The first hard disk drive 61, the second hard disk drive 62, the control board 63, the power supply board 64, the main board 65, and the heat discharger 66 are provided inside of the housing 51.

The first hard disk drive 61 and the second hard disk drive 62 are storage devices each having a hard disk inside thereof. The first hard disk drive 61 and the second hard disk drive 62 each have a certain external shape defined in a standard, a specification, or the like. Examples of the external shape of the first hard disk drive 61 and the second hard disk drive 62 include a substantially thin platy shape.

The control board 63 controls the first hard disk drive 61 and the second hard disk drive 62. In the present embodiment, the control board 63 controls the first hard disk drive 61 and the second hard disk drive 62 to function as redundant arrays of inexpensive disks (RAID) unit.

The power supply board 64 externally receives the electricity through the power supply connector 36 to operate the components in the information processing device 20. On the main board 65, a CPU, a memory, and various types of circuits are implemented. The main board 65 accesses the first hard disk drive 61 and the second hard disk drive 62 that function as a RAID unit through the control board 63. The heat discharger 66 is installed on the main board 65. The heat discharger 66 discharges the heat of the various types of circuits (e.g., a CPU) mounted on the main board 65.

The first hard disk drive 61, the second hard disk drive 62, the control board 63, the power supply board 64, and the main board 65 each have a substantially thin platy shape. The first hard disk drive 61, the second hard disk drive 62, the control board 63, the power supply board 64, and the main board 65 are disposed so that their main faces of the respective thin plates are parallel to the direction extending from the front face 52 to the back face 53 (the Y direction). The first hard disk drive 61, the second hard disk drive 62, the control board 63, the power supply board 64, and the main board 65 are provided side by side in the direction (the X direction in the present embodiment) orthogonal to the direction extending from the front face 52 to the back face 53.

With the above-described layout of the first hard disk drive 61, the second hard disk drive 62, the control board 63, the power supply board 64, and the main board 65, the air taken from the fan 60 can smoothly flow. This configuration enables the fan 60 to efficiently cool these components.

In the housing 51, the main board 65, the power supply board 64, the control board 63, the second hard disk drive 62, and the first hard disk drive 61 are disposed in this order in the direction (the X direction in the present embodiment) orthogonal to the direction extending from the front face 52 to the back face 53.

The fan 60 is disposed in a position facing the power supply board 64 and the main board 65, on the back face 53. This configuration enables the fan 60 to efficiently cool the components mounted on the power supply board 64 and the main board 65.

The fan 60 is disposed in a position different from that of the RAID unit (the first hard disk drive 61, the second hard disk drive 62, and the control board 63), on the back face 53. It is noted that the lengths in the Y direction of the control board 63, the power supply board 64, and the main board 65 are designed to be smaller than the length in the Y direction of the first hard disk drive 61 (and the second hard disk drive 62). With the above-described layout of the fan 60, the size of the housing 51 of the information processing device 20 in the Y direction can be reduced down to a size that can at least accommodate the first hard disk drive 61.

On the surface of the control board 63 on the side of the power supply board 64 and the main board 65, a semiconductor device 71 is mounted. The semiconductor device 71 is a relatively large heat source out of the components mounted on the control board 63.

On the control board 63, a heat discharging plate 72 in a thin platy shape is provided that is made of a material such as copper having high heat conductivity, for example, on the face on the side of the main board 65. The heat discharging plate 72 contacts the surface (the upper surface) of the semiconductor device 71 opposite from the mounting surface thereof to the control board 63 and is disposed substantially in parallel with the control board 63.

On the control board 63, a flow splitter 73 is provided for taking the air from the fan 60 into the space between the control board 63 and the heat discharging plate 72. The flow splitter 73 is formed, as illustrated in FIG. 6, so that a part of the heat discharging plate 72 on the side of the fan 60 in the Y direction (on the side of the back face 53) is bent at an angle of about 15 to 45 degrees, for example, toward the main board 65.

The flow splitter 73 with the above-described structure can send, as illustrated with the arrows in FIGS. 5 and 6, a part of the air taken by the fan 60 to the semiconductor device 71 mounted on the control board 63. This operation enables the information processing device 20 to efficiently cool the semiconductor device 71 mounted on the control board 63 using the air flown from the fan 60 disposed in a position facing the power supply board 64 and the main board 65.

Figure 7:
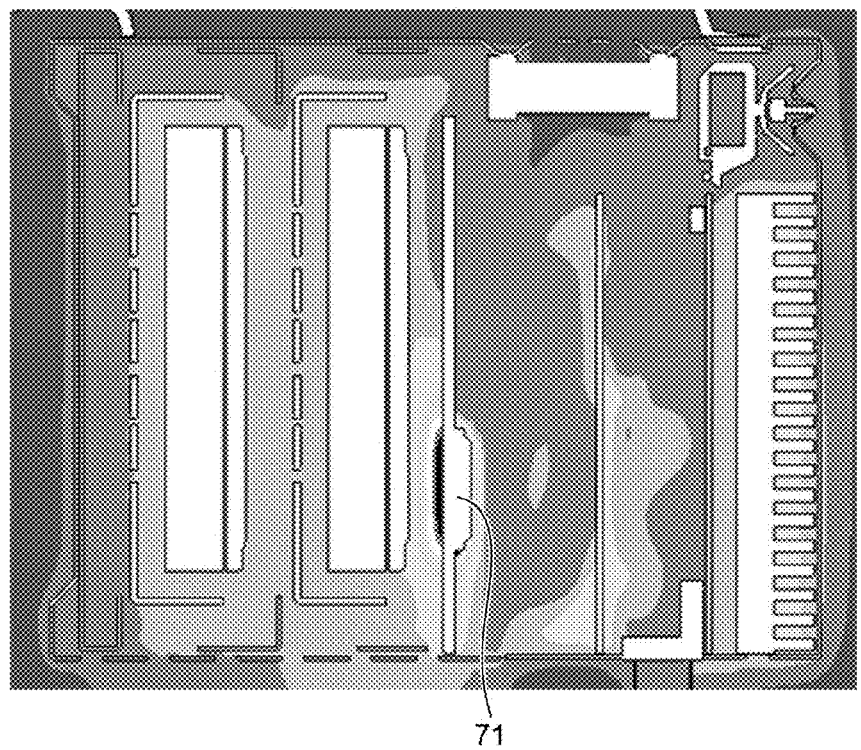
FIG. 7 is a diagram illustrating a simulation result of the heat distribution in the information processing device 20 according to the first embodiment when a flow splitter 73 is not provided therein.
Figure 8:
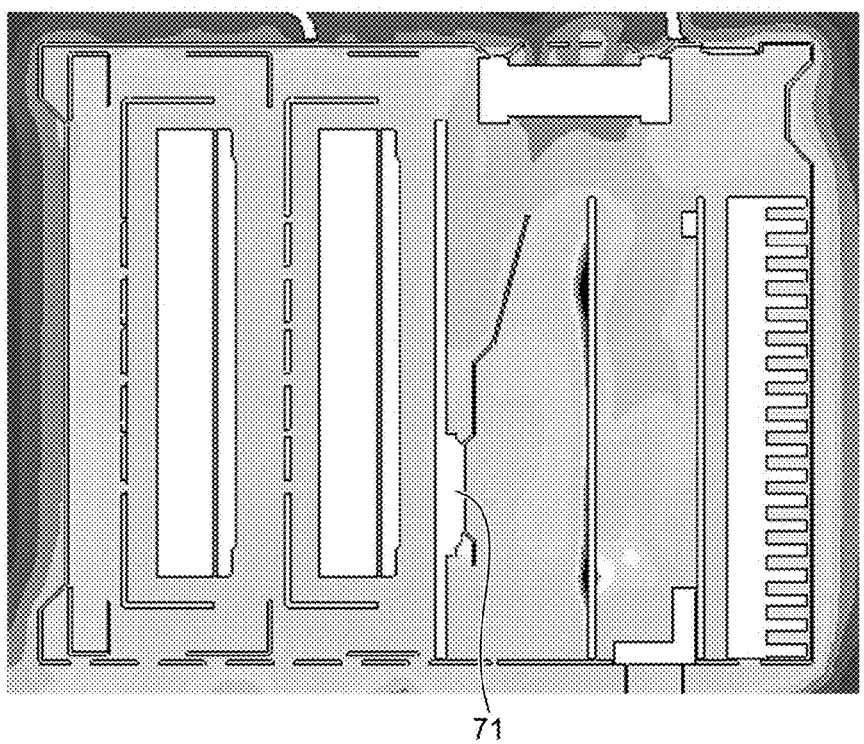
FIG. 8 is a diagram illustrating a simulation result of the heat distribution in the information processing device 20 according to the first embodiment when the flow splitter 73 is provided therein.

FIG. 7 is a diagram illustrating a simulation result of the heat distribution in the information processing device 20 when the flow splitter 73 is not provided therein. FIG. 8 is a diagram illustrating a simulation result of the heat distribution in the information processing device 20 when the flow splitter 73 is provided therein. FIGS. 7 and 8 illustrate the heat distribution inside of the information processing device 20 viewed from the upper side. The darker portions represent the higher temperature portions in the diagrams.

As illustrated in FIG. 7, if the flow splitter 73 is not provided, the heat accumulates around the semiconductor device 71, which prevents the semiconductor device 71 from being cooled efficiently. By contrast, as illustrated in FIG. 8, if the flow splitter 73 is provided, the heat does not accumulate around the semiconductor device 71, which allows the semiconductor device 71 to be cooled efficiently.

As described above, the image forming apparatus 10 according to the present embodiment has the duct 40 and cools the information processing device 20, whereby the heat generated by the information processing device 20 provided inside of the image forming apparatus 10 is hardly conducted to portions (e.g., the image forming unit) other than the information processing device 20. This operation enables the image forming apparatus 10 according to the present embodiment to reduce the effect of the heat generated by the information processing device 20 provided inside of the image forming apparatus 10.

Second Embodiment

The following describes an image forming apparatus 10 according to a second embodiment of the present invention. The image forming apparatus 10 according to the second embodiment has substantially the same functions and configuration as those of the image forming apparatus 10 according to the first embodiment. Components having the same or similar functions as those of the first embodiment are denoted by like reference numerals, and the explanation will be mainly made of different parts while overlapped explanation thereof will be omitted.

Figure 9:
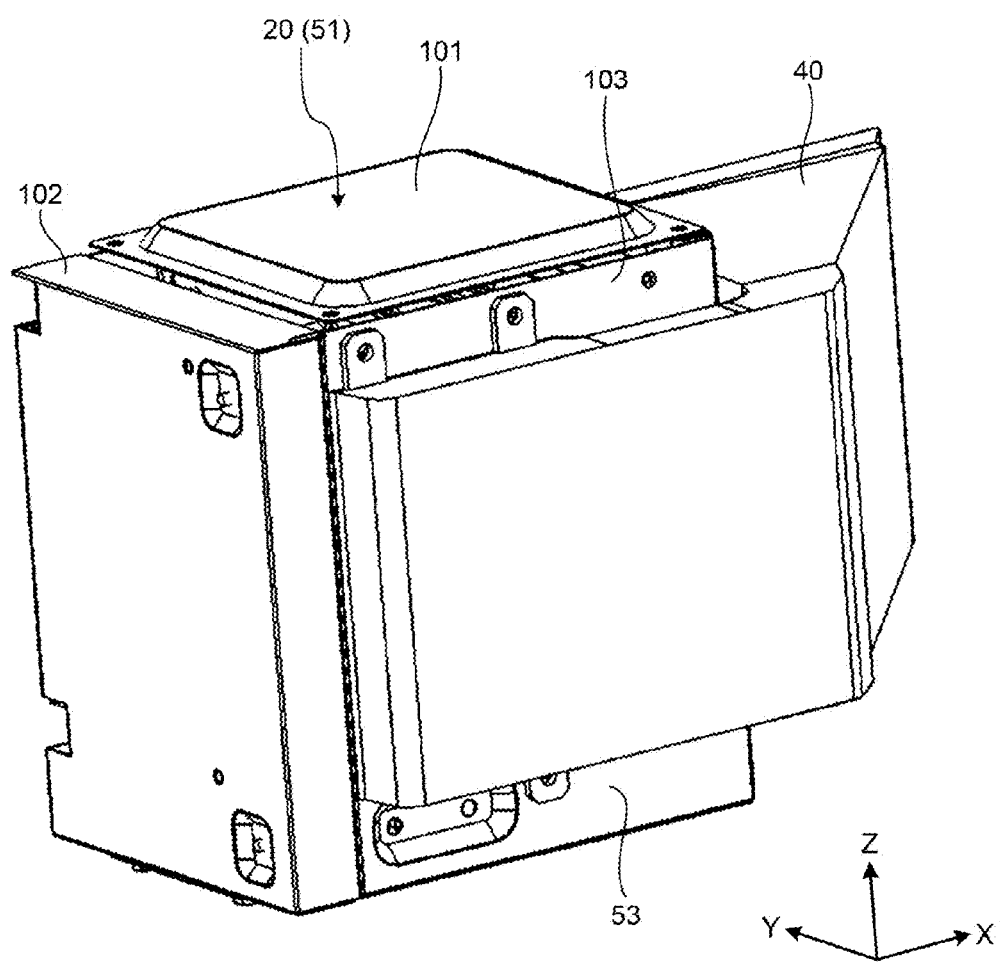
FIG. 9 is an external view of a housing 51 and a duct 40 in an information processing device 20 according to a second embodiment of the present invention viewed from the side of a back face 53.

FIG. 9 is an external view of a housing 51 and a duct 40 in an information processing device 20 according to the second embodiment viewed from the side of a back face 53. The housing 51 of the information processing device 20 according to the second embodiment includes an upper-surface section 101, a main-board section 102, and a hard-disk drive section 103. The upper-surface section 101 defines the upper surface portion of the housing 51. The main-board section 102 constitutes a portion of the housing 51 on the side of the main board 65. The hard-disk drive section 103 constitutes a portion of the housing 51 on the side of the first hard disk drive 61. The upper-surface section 101, the main-board section 102, and the hard-disk drive section 103 are coupled to each other with some screws, for example, whereby the entire housing 51 is formed in a substantially rectangular parallelepiped shape.

The duct 40 is fixed to the side of the back face 53 on the hard-disk drive section 103 of the housing 51 with screws.

Figure 10:
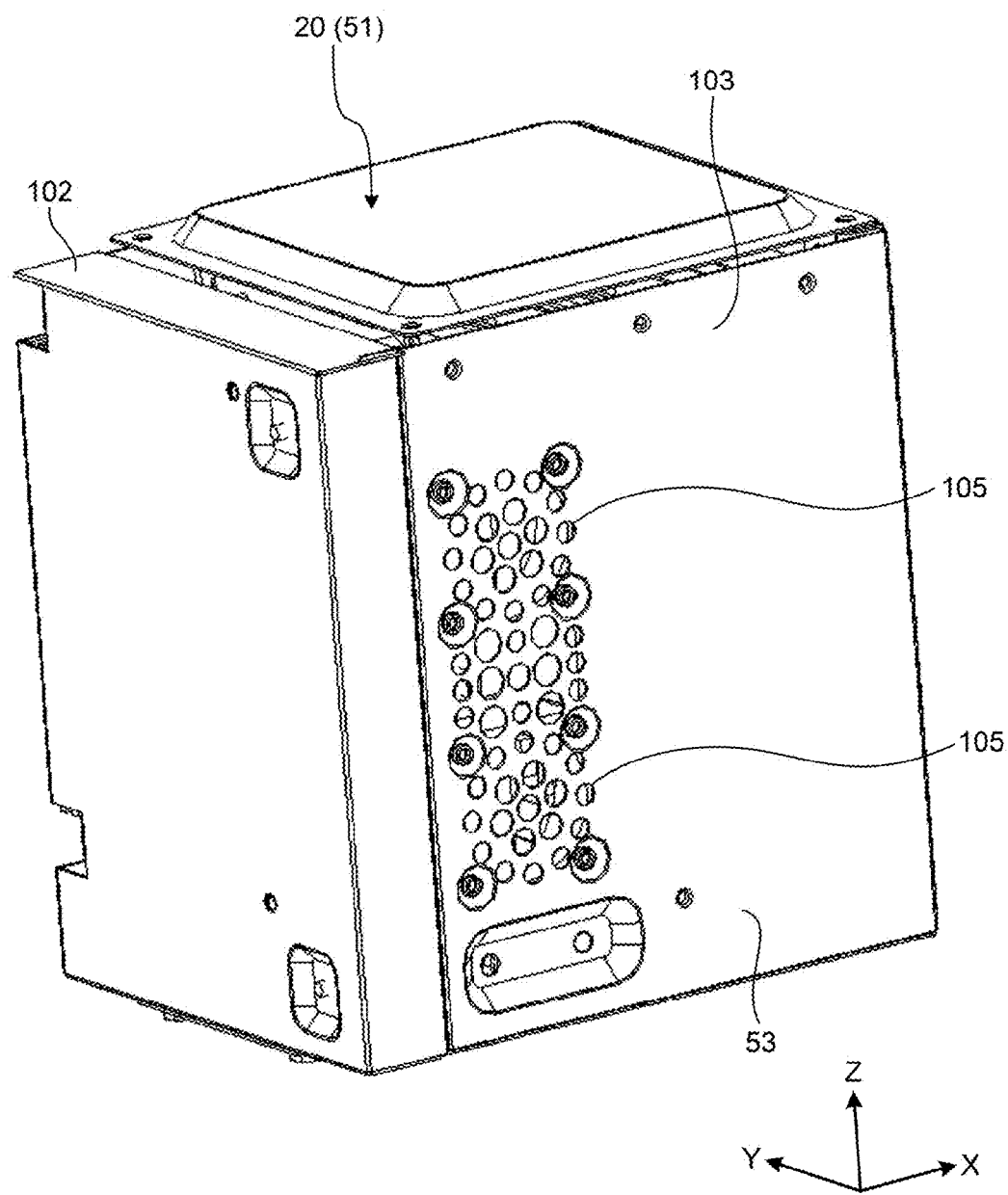
FIG. 10 is an external view of the housing 51 of the information processing device 20 according to the second embodiment viewed from the side of the back face 53.

FIG. 10 is an external view of the housing 51 of the information processing device 20 according to the second embodiment viewed from the side of the back face 53. FIG. 10 is the same as FIG. 9 excluding the duct 40. A plurality of air inlet holes 105 are formed in the region on the side of the back face 53 on the hard-disk drive section 103 where the duct 40 is installed. The rotation of the fan 60 behind the air inlet holes 105 takes the air from the duct 40 into the housing 51.

Figure 11:
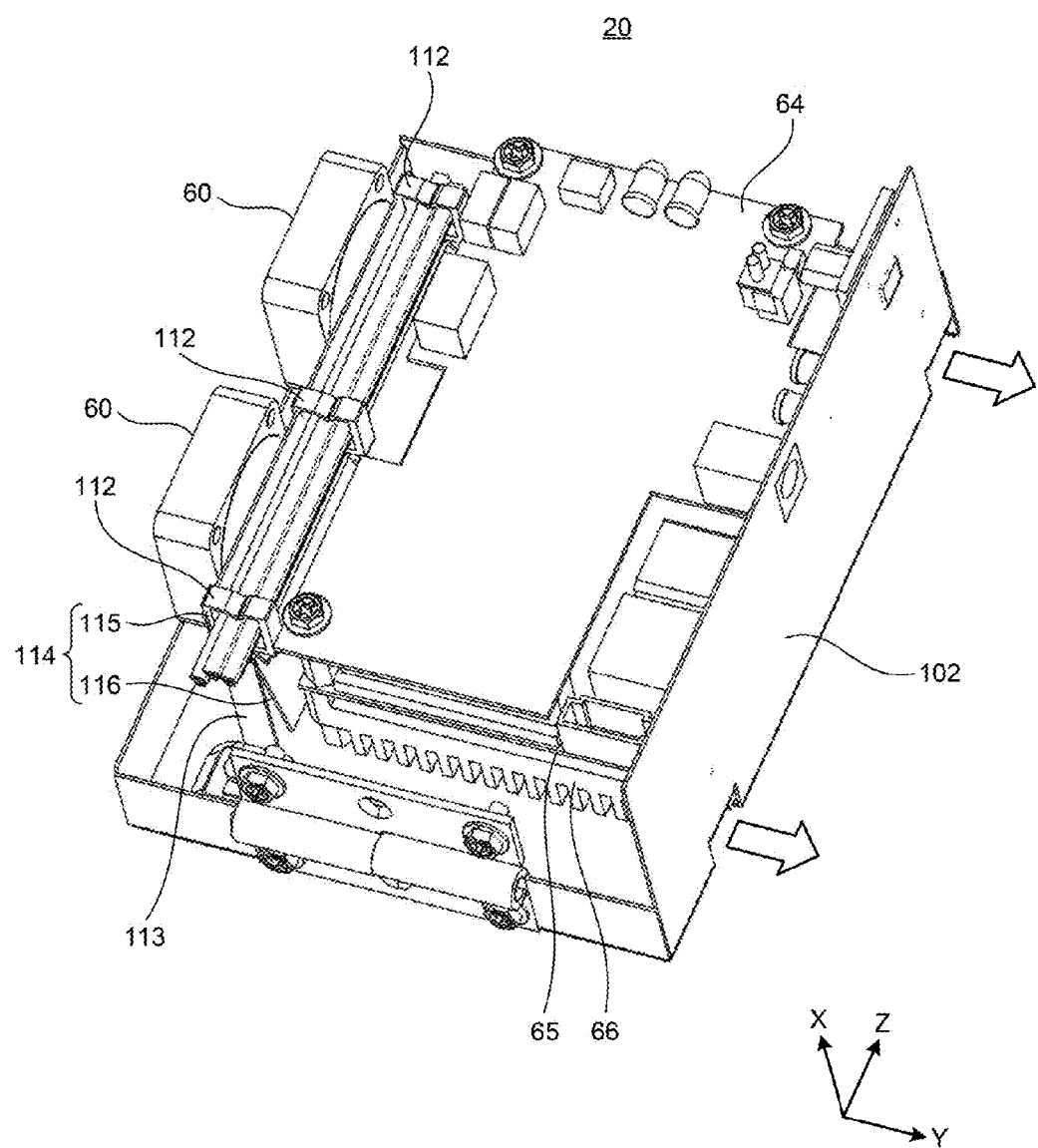
FIG. 11 is a perspective view illustrating the layout of some components disposed on the side of a main board 65 in the information processing device 20 according to the second embodiment.
Figure 12:
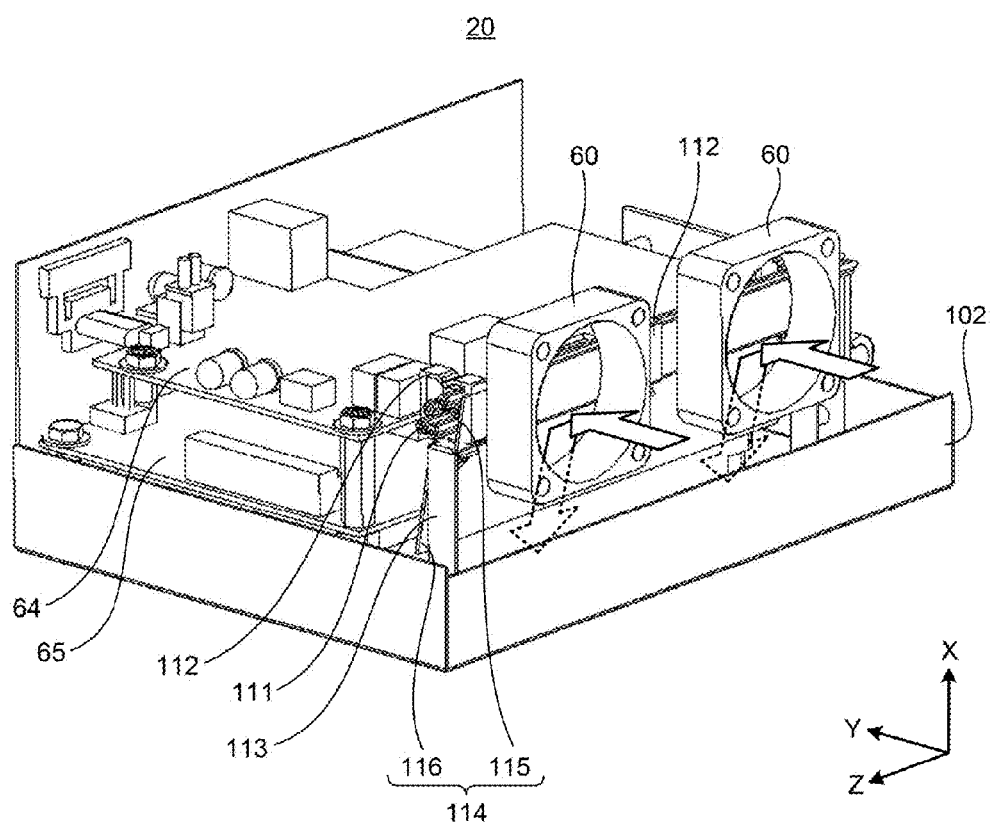
FIG. 12 is a perspective view illustrating some components disposed on the side of the main board 65 in the information processing device 20 according to the second embodiment viewed from a different direction from that in FIG. 11.
Figure 13:
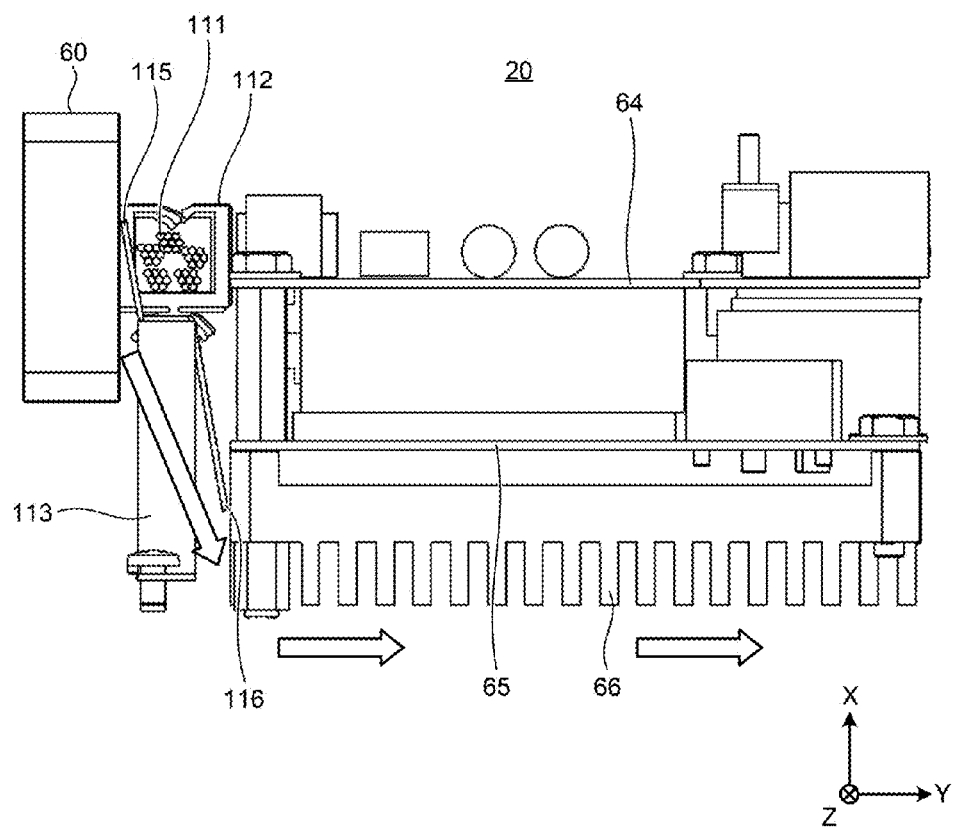
FIG. 13 is a plan view illustrating components disposed on the side of the main board 65 in the information processing device 20 according to the second embodiment viewed from the Z direction.

FIG. 11 is a perspective view illustrating the layout of some components disposed on the side of the main board 65 in the information processing device 20 according to the second embodiment. FIG. 12 is a perspective view illustrating some components disposed on the side of the main board 65 in the information processing device 20 viewed from a different direction from that in FIG. 11. FIG. 13 is a plan view illustrating components disposed on the side of the main board 65 in the information processing device 20 viewed from the Z direction.

The information processing device 20 according to the second embodiment includes two fans 60 provided side by side in the Z direction (the direction extending from the lower part to the upper part of the main body 12) in the housing 51. The information processing device 20 may include three or more fans 60 or only one fan 60.

The information processing device 20 further includes a plurality of cables 111, a plurality of holders 112, and a support 113 in the housing 51.

The cables 111 transmit a signal and transfer a voltage, and the like. Both of the ends of the cables 111 are not illustrated in FIGS. 11, 12 and 13.

The cables 111 are disposed so that a part of them is provided along the direction in parallel with the power supply board 64, that is, along the Z direction (the direction extending from the lower part to the upper part of the main body 12) in the space formed between the fans 60 and the power supply board 64. The cables 111 are disposed nearer to the side of the main board 65 in the X direction than the center of the fan 60 in the X direction.

The holder 112 is a member used for bundling and fastening the cables 111. The holder 112 is circularly formed, into which the cables 111 are inserted. The holders 112 fasten the cables 111 disposed along the Z direction at a plurality of positions.

The support 113 includes a base in a long and narrow shape extending in the Z direction and two legs extending from the respective ends of the base to the side of the main board 65 in the X direction. The holders 112 are provided on the base, which fasten the cables 111 at the positions along the base extending in the Z direction. The two legs are fixed to the main-board section 102.

The holders 112 and the support 113 function as cable fasteners for fixing the position of the cables 111 disposed along the Z direction in the space between the fan 60 and the power supply board 64.

The information processing device 20 further includes a wall 114 provided in the housing 51. The wall 114 leads a part of the air taken in by the fan 60 to the main board 65. The wall 114 is mounted on the support 113.

The wall 114 includes an upper wall 115 and a lower wall 116. The upper wall 115 and the lower wall 116 each have a thin platy shape extending in the Z direction and are mounted along the base of the support 113.

The upper wall 115 is disposed so as to extend in the X direction with a certain angle from the support 113 to the side opposite from the main board 65. The upper wall 115 is disposed at a certain angle with respect to the X direction so as to stand between the cables 111 and the fans 60 and so that the air taken in by the fan 60 flows into the side of the main board 65. As a result, a part of the air taken in by the fan 60 hits the upper wall 115, which can lead the hit air toward the main board 65. The upper wall 115 does not obstruct all the air taken in by the fan 60. Instead, the upper wall 115 obstructs a part of the air and leads the air in the X direction toward the main board 65.

The lower wall 116 is disposed so as to extend in the X direction with an angle similar to that of the upper wall 115 from the support 113 to the side of the main board 65. This configuration enables the lower wall 116 to lead the air taken in by the fan 60 and led to the main board 65 by the upper wall 115, further toward the main board 65.

The lower wall 116, as illustrated in FIG. 13, leads a part of the air taken in by the fan 60 toward the surface of the main board 65 where the heat discharger 66 is provided. As described above, in the present embodiment, the wall 114 is provided including the upper wall 115 and the lower wall 116, thereby improving the cooling efficiency by the heat discharger 66 to efficiently cool the main board 65.

The wall 114 is made of a metallic material, which can isolate electromagnetic waves. In the present embodiment, the wall 114 therefore shuts off unnecessary radiation from the fans 60 or outside of the information processing device 20, whereby the power supply board 64 and the main board 65 operate stably.

Figure 14:
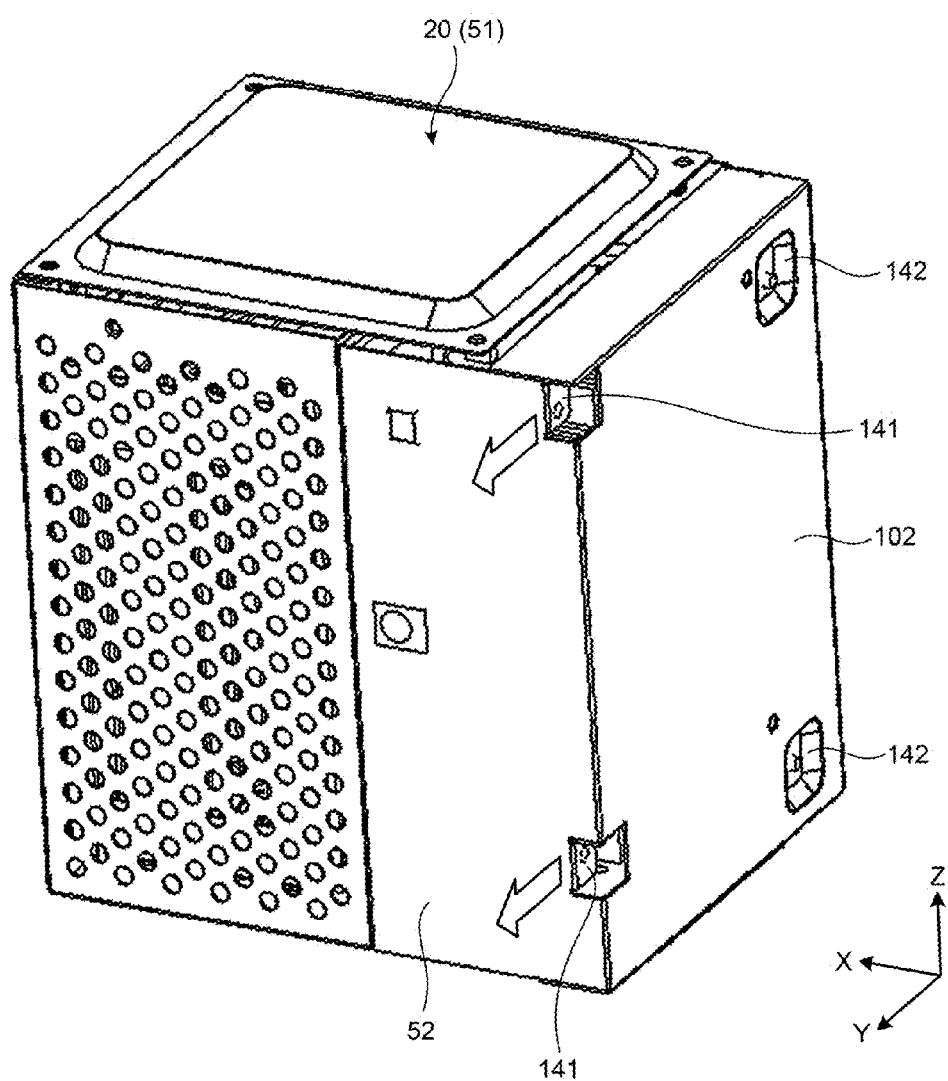
FIG. 14 is an external view illustrating the information processing device 20 according to the second embodiment viewed from the side of a front face 52.

FIG. 14 is an external view illustrating the information processing device 20 according to the second embodiment viewed from the side of the front face 52. The main-board section 102 of the housing 51 has air outlet holes 141 for discharging air provided on the side of the front face 52. The air outlet holes 141 are through holes and discharge the air passing through in the vicinity of the heat discharger 66 on the main board 65 to the outside.

The air outlet holes 141 are each formed by bending inward a part of the front face 52 of the main-board section 102. The main board 65 is fixed to the inwardly bent portions of the air outlet holes 141 inside of the housing 51. That is, the main board 65 is fixed to the housing 51 without any additional components. This configuration enables the downsizing and lightweighting of the device in the present embodiment.

The main-board section 102 of the housing 51 has dimples 142 on the side surface. The dimples 142 are each formed in a concaved shape by bending inward a part of the main-board section 102 of the housing 51. The dimples 142 are not through holes.

The main board 65 is fixed to the inner parts of the dimples 142 inside of the housing 51. That is, the main board 65 is fixed to the housing 51 without any additional components.

Fixing the main board 65 to the dimples 142 secures a space in the housing 51 between the heat discharger 66 and the housing 51, whereby the air readily flows inside thereof. As described above, in the present embodiment, fixing the main board 65 to the dimples 142 enables efficient cooling of the heat discharger 66. Furthermore, in the present embodiment, no through hole is formed on the side wall in the vicinity of the heat discharger 66 in the housing 51. This configuration prevents the air on its way from the fan 60 to the air outlet holes 141 from leaking to the outside, thereby further efficiently cooling the heat discharger 66.

As described above, the image forming apparatus 10 according to the present embodiment has the wall 114 to lead a part of the air taken in by the fan 60 to the direction toward the heat discharger 66 on the main board 65, thereby efficiently cooling the main board 65.

Figure 15:
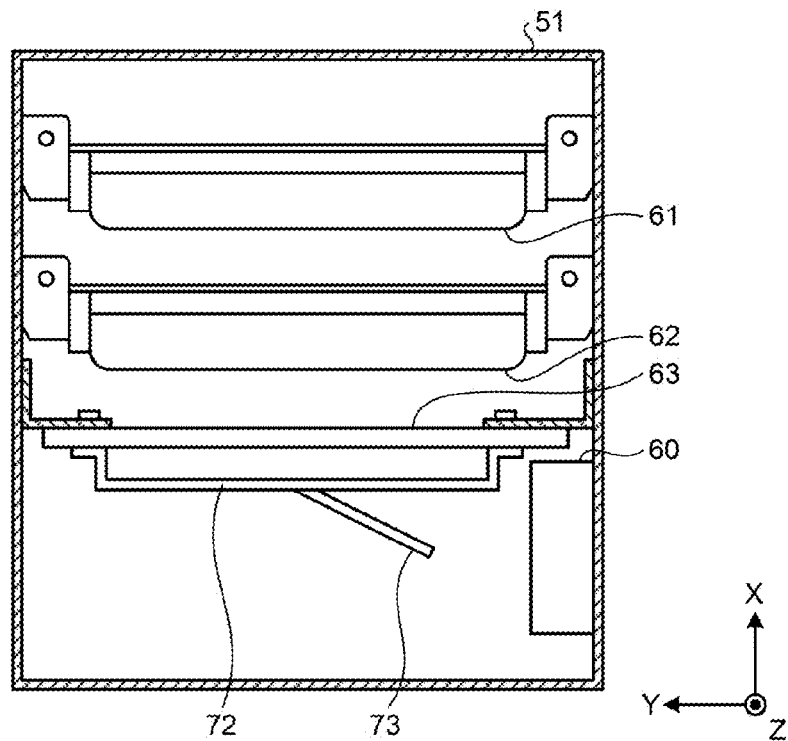
FIG. 15 is a diagram illustrating the layout of a control board 63 and a heat discharging plate 72 in the information processing device 20 according to the second embodiment.

FIG. 15 is a diagram illustrating the layout of a control board 63 and a heat discharging plate 72 in the information processing device 20 according to the second embodiment. The information processing device 20 according to the second embodiment has the heat discharging plate 72 provided on the surface of the control board 63 on the side of the power supply board 64, in the same manner as the first embodiment. The heat discharging plate 72 has a flow splitter 73 formed by bending a part of the heat discharging plate 72 itself. The flow splitter 73 leads a part of the air taken in by the fan 60 to the direction toward the control board 63 to efficiently cool the semiconductor device provided on the control board 63 and serving as a source of the heat. According to the second embodiment, even if a part of the air taken in by the fan 60 is led to the main board 65, a part of the air can be led toward the control board 63 in the same manner as the first embodiment.

Figure 16:
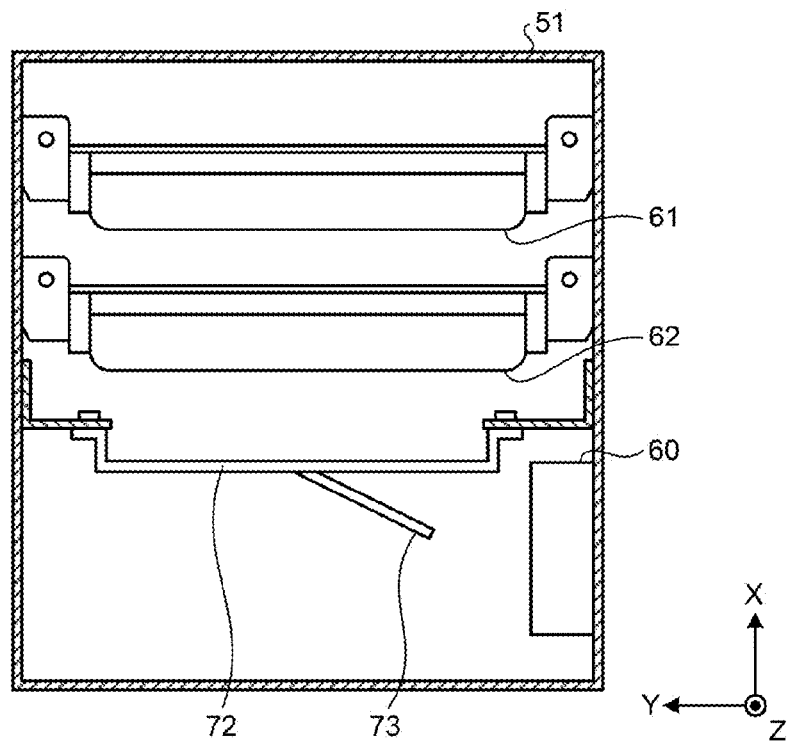
FIG. 16 is a diagram illustrating the layout of a heat discharging plate 72 in an information processing device 20 according to a first modification of the present invention.

FIG. 16 is a diagram illustrating the layout of a heat discharging plate 72 in an information processing device 20 according to a first modification of the present invention. As illustrated in FIG. 16, the information processing device 20 according to the first modification does not include the control board 63. The main board 65 according to the first modification directly controls the first hard disk drive 61 and the second hard disk drive 62. With the structure of the information processing device 20 according to the first modification, the cost of the storage device can be reduced although the redundancy of the storage device is also reduced. The first modification can be applied to both the first embodiment and the second embodiment.

In the first modification, the heat discharging plate 72 is mounted in the position where the control board 63 is mounted in the housing 51 in the first and second embodiments. This layout mounts the heat discharging plate 72 nearer to the side of the first hard disk drive 61 than the layout in the first and the second embodiments. This configuration in the first modification reduces the amount of the air led toward the first hard disk drive 61, because the flow splitter 73 on the heat discharging plate 72 takes in the smaller amount of the air taken by the fan 60 than the amount of the air in the first and the second embodiments. In the first modification, however, the smaller quantity of heat is generated because the control board 63 is not provided, and thus the first hard disk drive 61 and the second hard disk drive 62 can be sufficiently cooled. Furthermore, in the first modification, the number of rotations of the fans 60 can be reduced because there is no need to cool the control board 63. This configuration enables a reduction in the power consumption and the noise generated in the information processing device 20.

Figure 17:
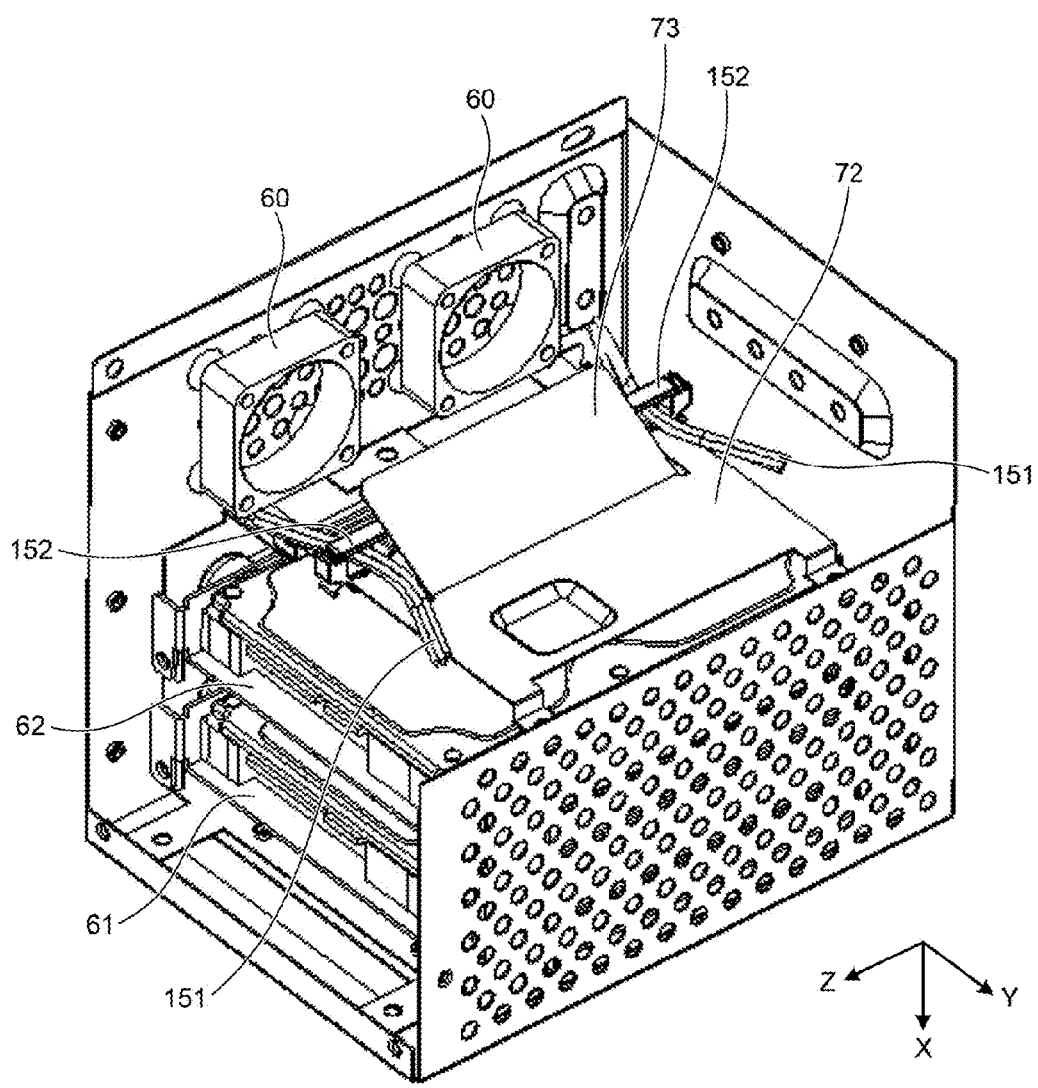
FIG. 17 is a perspective view illustrating components disposed on the side of a first hard disk drive 61 in an information processing device 20 according to a second modification.

FIG. 17 is a perspective view illustrating components disposed on the side of a first hard disk drive 61 in an information processing device 20 according to a second modification.

The information processing device 20 according to the second modification has cables 151 bridging between the heat discharging plate 72 and the power supply board 64 in the Y direction. The information processing device 20 according to the second modification further includes a retainer 152 for retaining the position of the cables 151.

The retainer 152 includes a bar-like member extending in the Z direction. Both the ends of the bar-like member of the retainer 152 are fixed to the housing 51, for example. The bar-like member of the retainer 152 is disposed inside (on the side of the first hard disk drive 61) of the flow splitter 73 formed by bending the heat discharging plate 72.

Figure 18:
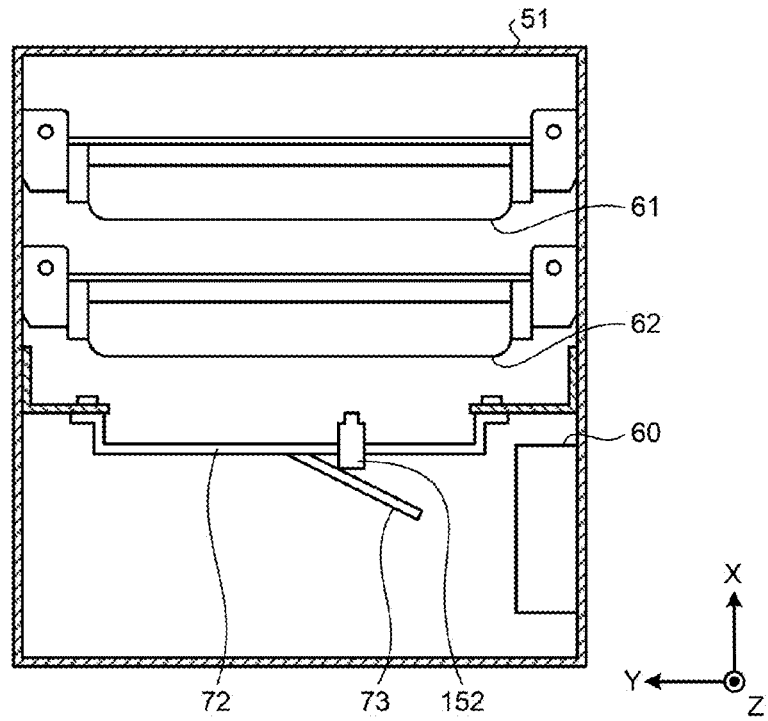
FIG. 18 is a first example view illustrating the layout of a flow splitter 73 and a retainer 152 in the information processing device 20 according the second modification.
Figure 19:
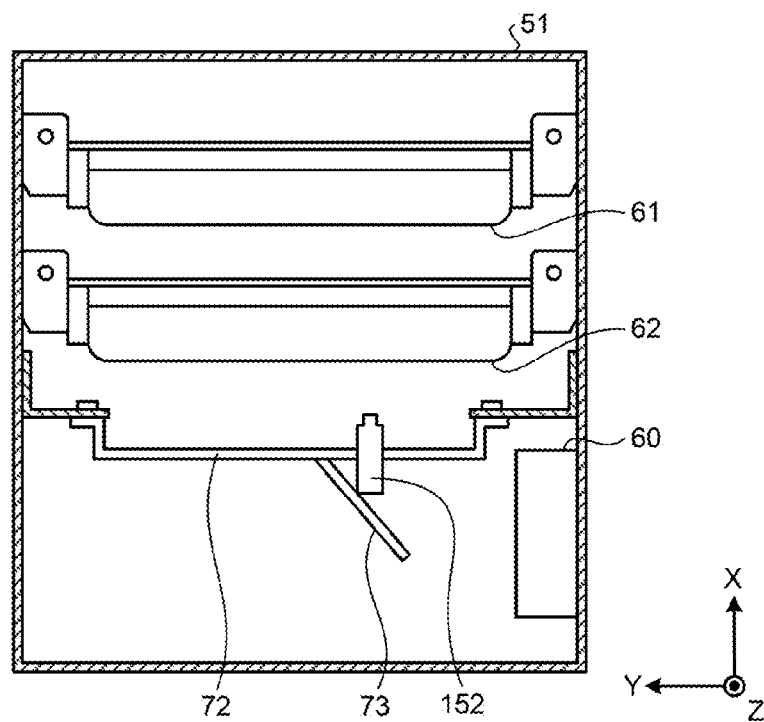
FIG. 19 is a second example view illustrating the layout of a heat discharging plate 72 and the retainer 152 in the information processing device 20 according the second modification.

FIG. 18 is a first example view illustrating the layout of the flow splitter 73 and the retainer 152 in the information processing device 20 according the second modification. FIG. 19 is a second example view illustrating the layout of the heat discharging plate 72 and the retainer 152 in the information processing device 20 according the second modification.

The bar-like member of the retainer 152 is disposed so as to contact the inside of the flow splitter 73 formed by bending the heat discharging plate 72. The retainer 152 therefore restricts the spring force (the force to close) of the flow splitter 73, thereby maintaining the angle of the bending of the flow splitter 73. That is, the retainer 152 functions as an angle regulator for regulating the angle of the flow splitter 73. In the second modification, regulating the height of the retainer 152 in the X direction enables control of the bending angle of the flow splitter 73 to an appropriate value.

For example, as illustrated in FIG. 18, the relatively smaller height of the retainer 152 in the X direction decreases the bending angle of the flow splitter 73, thereby reducing the amount of the air taken in by the fan 60 and led toward the first hard disk drive 61. As illustrated in FIG. 19, the relatively larger height of the retainer 152 in the X direction increases the bending angle of the flow splitter 73, thereby increasing the amount of the air taken in by the fan 60 and led toward the first hard disk drive 61.

In the second modification, regulating the size or the height of the retainer 152 enables control of the cooling efficiency in the information processing device 20 in optimal. This configuration reduces the number of rotations of the fan 60, thereby reducing the power consumption and the noise generated in the information processing device 20. The second modification can be applied to both the first embodiment and the second embodiment.

While certain embodiments according to the present invention have been described, these embodiments have been presented by way of example only, and are not intended to limit the scope of the invention. The new embodiments described above may be embodied in a variety of other forms. In the embodiments, the information processing device 20 is provided in the image forming apparatus 10. The information processing device 20 may be, for another example, provided in an apparatus other than the image forming apparatus 10. In addition, the information processing device 20 may be provided in a standalone apparatus such as a copier, a facsimile machine, and a printer. Furthermore, the information processing device 20 may be provided in a projector or the like.

According to the present invention, the effect of the heat can be reduced that is generated by an information processing device provided inside of an electronic device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a main body;
an image forming unit housed in the main body, the image forming unit configured to form an image on a sheet;
a paper storage section housed in a lower portion of the main body, the paper storage section including a paper feeding device configured to store and feed the sheet into the image forming unit;
an information processing device housed in the paper storage section, the information processing device including a housing having a front face, the front face including an air intake opening and an air emission opening;
a duct that leads external air of the main body to the information processing device, the air intake opening in fluidic communication with the air emission opening via the duct, wherein
the information processing device comprises a fan disposed in the duct on a back face of the housing opposite from the front face of the housing that takes the external air from the air intake opening of the front face into the inside through the duct and discharges the external air to the outside through the air emission opening of the front face; and
the information processing device including in the housing,
a hard disk drive,
a control board configured to controls the hard disk drive,
a power supply board configured to receive external electricity and operates components in the information processing device, and
a main board including a central processing unit (CPU).

2. The image forming apparatus according to claim 1, wherein the air intake opening includes a plurality of air intake holes that leads the external air to the duct, and the air emission opening includes a plurality of air emission holes that discharges the air emitted from the front face of the housing of the information processing device to outside of the housing of the information processing device.

3. The image forming apparatus according to claim 1, wherein
the hard disk drive, the control board, the power supply board, and the main board each have a thin platy shape and are disposed so that main faces of the respective thin platy shapes are parallel to the direction extending from the front face to the back face of the information processing device; and
the main board, the power supply board, the control board, and the hard disk drive are disposed in a direction orthogonal to the direction extending from the front face to the back face; and
the fan is disposed in a position facing the power supply board on the back face.

4. The image forming apparatus according to claim 3, wherein
the control board is mounted with a semiconductor device on a surface of the control board on the side of the main board,
the control board is provided with a heat discharging plate that contacts the semiconductor device, and
the heat discharging plate has a thin platy shape and disposed in parallel with the control board.

5. The image forming apparatus according to claim 4, wherein the information processing device further comprises a flow splitter that takes the air from the fan into the space between the control board and the heat discharging plate.

6. The image forming apparatus according to claim 5, wherein the flow splitter is formed by bending a part of the heat discharging plate on the side of the back face toward the main board.

7. The image forming apparatus according to claim 6, wherein the information processing device further comprises an angle regulator that maintains the angle of the bending of the flow splitter.

8. The image forming apparatus according to claim 7, wherein the angle regulator retains a cable disposed between the heat discharging plate and the power supply board and in parallel with the heat discharging plate.

9. The image forming apparatus according to claim 3, wherein the information processing device further comprises:
- a cable disposed between the fan and the power supply board and in parallel with the power supply board;
- a cable fastener that fixes the position of the cable; and
- a wall that is mounted on the cable fastener and leads a part of the air taken in by the fan in the direction toward the main board.

10. The image forming apparatus according to claim 9, wherein the wall is made of a metallic material.

11. The image forming apparatus according to claim 9, wherein
- the information processing device further comprises a heat discharger provided on a surface of the main board on the side opposite from the power supply board, wherein
- the wall leads a part of the air taken in by the fan toward the surface of the main board where the heat discharger is provided.

12. The image forming apparatus according to claim 11, wherein
- the housing comprises an air outlet hole formed by bending inward a part of the front face, and
- the main board is fixed to the inwardly bent portion of the air outlet hole inside of the housing.

13. The image forming apparatus according to claim 1, wherein
- the information processing device is disposed behind the paper feeding device, and
- the panel is a rear panel of the paper feeding unit.

* * * * *